US010367949B2

(12) United States Patent
Awano et al.

(10) Patent No.: US 10,367,949 B2
(45) Date of Patent: Jul. 30, 2019

(54) ECHO CANCELLER DEVICE AND VOICE TELECOMMUNICATIONS DEVICE (71) Applicant: Mitsubishi Electric Corporation, Tokyo (JP)

(72) Inventors: Tomoharu Awano, Tokyo (JP); Satoru Furuta, Tokyo (JP); Jun Ishii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/775,201

(22) PCT Filed: Nov. 16, 2015

(86) PCT No.: PCT/JP2015/082109
§ 371 (c)(1),
(2) Date: May 10, 2018

(87) PCT Pub. No.: WO2017/085760
PCT Pub. Date: May 26, 2017

(65) Prior Publication Data
US 2018/0343345 A1 Nov. 29, 2018

(51) Int. Cl.
*H04B 3/23* (2006.01)
*H04M 1/60* (2006.01)
*H04M 9/08* (2006.01)

(52) U.S. Cl.
CPC .............. *H04M 9/082* (2013.01); *H04B 3/23* (2013.01); *H04M 1/60* (2013.01); *H04M 9/087* (2013.01)

(58) Field of Classification Search
CPC ........ H04M 9/082; H04M 1/60; H04M 9/087; H04B 3/23
See application file for complete search history.

(56) References Cited

U.S. PATENT DOCUMENTS 5,463,618 A  10/1995 Furukawa et al.
5,592,548 A * 1/1997 Sih .......................... H04B 3/23
                                                              379/3

(Continued)

FOREIGN PATENT DOCUMENTS

JP  06-338827 A   12/1994
JP  2008-124914 A  5/2008
JP  2009-159274 A  7/2009

OTHER PUBLICATIONS

Fujii et al., "Double-Talk Detection Method with Detecting Echo Path Fluctuation," IEICE Transactions (A), vol. J78-A, No. 3, Mar. 1995, pp. 314-322.

(Continued)

*Primary Examiner* — Lisa Hashem
(74) *Attorney, Agent, or Firm* — Birch, Stewart, Kolasch & Birch, LLP (57) ABSTRACT Disclosed is an echo canceller including: a false echo calculator that calculates false echo signals by performing a filtering operation using each of current and previous filter-coefficient groups which used by an adaptive filtering unit on a sequence of reception signals (x(n)); an evaluation value calculator that calculates evaluated values of an echo cancellation quantity on the basis of a voice-transmission signal (y(n)) and the false echo signals; a false echo selector that selects an estimated echo component from the false echo components on the basis of the evaluated values of the echo cancellation quantity; and a signal output unit ($S_{out}$) that outputs a residual signal (e(n)).

8 Claims, 7 Drawing Sheets (56) References Cited

U.S. PATENT DOCUMENTS

| | | | | |
|---|---|---|---|---|
| 5,859,914 A * | 1/1999 | Ono | ............... | H04M 9/082 379/406.08 |
| 5,905,717 A * | 5/1999 | Hasegawa | ............... | H04B 3/23 370/289 |
| 6,078,567 A * | 6/2000 | Traill | ............... | H04B 3/23 370/289 |
| 6,181,753 B1 * | 1/2001 | Takada | ............... | H04M 9/082 370/286 |
| 6,185,300 B1 * | 2/2001 | Romesburg | ............... | H04M 9/082 379/406.09 |
| 6,192,126 B1 * | 2/2001 | Koski | ............... | H04B 3/234 379/406.14 |
| 2010/0191527 A1 * | 7/2010 | Matsuo | ............... | H04R 3/02 704/226 |
| 2014/0112467 A1 * | 4/2014 | Wyss | ............... | H04B 3/23 379/406.08 |
| 2015/0078567 A1 * | 3/2015 | Mani | ............... | G10K 11/175 381/66 |
| 2018/0343345 A1 * | 11/2018 | Awano | ............... | H04B 3/23 |

OTHER PUBLICATIONS

International Search Report for PCT/JP2015/082109 (PCT/ISA/210) dated Feb. 9, 2016.
Ochiai et al., "Echo Canceler with Two Echo Path Models", IEEE Transacitons on Communications, vol. Com-25, No. 6, Jun. 1977, pp. 589-595.

* cited by examiner

ECHO CANCELLER DEVICE AND VOICE TELECOMMUNICATIONS DEVICE

TECHNICAL FIELD

The present invention relates to an echo-cancellation technique for reducing acoustic echo components included in an acoustic signal detected by a microphone, and more particularly to an echo-cancellation technique for reducing an acoustic echo component by using an adaptive filter.

BACKGROUND ART

When bidirectional communications are carried out between two voice telecommunications devices each having a microphone and a speaker, a sound (e.g., a sender's voice or background noise) collected by a microphone of one of the voice telecommunications devices is played back by a speaker of the other voice telecommunications device after being transmitted via an electrical communication network to the other voice telecommunications device on the other end of the communication. However, when the played-back sound goes around from the speaker directly or indirectly to the microphone and is collected, the played-back sound is returned to the voice telecommunications device which is the transmission source. Such a played-back sound returned to the voice telecommunications device which is the transmission source is called the "acoustic echo."

As a device that suppresses an acoustic echo, an echo canceller which employs an adaptive filter is used widely. In this type of echo canceller, an adaptive filter successively estimates, i.e., learns the characteristics of a transmission path (also referred to as an "echo path" hereafter) via which an acoustic echo travels from a speaker to a microphone, and generates a false echo signal (also referred to as an "echo replica"). Then, by removing the false echo signal from the voice-transmission signal to be transmitted to the voice telecommunications device which is the transmission source, the acoustic echo component included in the voice-transmission signal can be reduced. Therefore, it can be said that the performance of the adaptive filter determines the echo cancellation performance of the echo canceller.

As a cause of an impediment to such the learning of the echo path characteristics which is carried out by the adaptive filter, there can be considered mixing of a disturbance signal into an acoustic signal detected by the microphone. For the adaptive filter, a near end speaker's voice or background noise which is mixed into an acoustic echo is a disturbance signal, and is an impediment to the learning of the echo path characteristics. Particularly, a double talk state in which a near end speaker's voice and an acoustic echo are mixed into the microphone becomes a problem as a cause of an impediment to the learning of the echo path characteristics.

As a measure against the above-mentioned problem resulting from a double talk, an echo canceller including an adaptive filter and a double talk detecting circuit for determining the presence or absence of occurrence of a double talk is known. This type of echo canceller is disclosed by, for example, Nonpatent Literature 1 mentioned below. An acoustic echo canceller disclosed by Nonpatent Literature 1 includes a double talk detecting circuit that monitors the amount of echo cancellation as a detection parameter, and that, when the amount of echo cancellation becomes equal to or larger than a predetermined amount, determines that a double talk has occurred and stops updating of an adaptive filter coefficient.

Further, an echo canceller that in order to improve the robustness against a disturbance signal of the learning of the echo path characteristics, includes two types of filters is also known. This type of echo canceller is disclosed by, for example, Nonpatent Literature 2 as listed below. The echo canceller disclosed by Nonpatent Literature 2 includes a background (BG) filter that learns the echo path characteristics, and a foreground (FG) filter in which a result of the learning carried out by the BG filter is incorporated over a certain period of time, and uses the FG filter for echo cancellation.

An echo canceller including two types of filters and a double talk detecting circuit is disclosed by Patent Literature 1 (Japanese Patent Application Publication No. 1994(H06)-338827).

CITATION LIST

Patent Literature

Patent Literature 1: Japanese Patent Application Publication No. 1994(H06)-338827 (for example, see FIG. 1 and paragraphs [0014] to [0020])

Non-Patent Literatures

Non-Patent Literature 1: Fujii Kensaku, Ohga Juro, "Double-Talk Detection Method with Detecting Echo Path Fluctuation," IEICE Transactions (A), vol. J78-A, no. 3, pp. 314-322, March 1995.

Non-Patent Literature 2: K. Ochiai, T. Araseki, and T. Ogihara, "Echo canceller with two echo path models," IEEE Transactions on Communications, vol. COM-25, no. 6, pp. 589-595, June 1977.

SUMMARY OF INVENTION

Technical Problem

In a conventional echo canceller including such a double talk detecting circuit as above, there is a case in which the amount of echo cancellation extremely decreases when an adaptive filter carries out erroneous learning as a result of erroneous determination carried out by the double talk generating circuit. Further, in a conventional echo canceller including such two types of filters as above, there is a case in which the robustness against a disturbance signal cannot be maintained when both the two types of filters carry out erroneous learning as a result of the occurrence of a double talk. Therefore, the above-mentioned conventional echo cancellers do not necessarily provide echo cancellation performance which is stable under an environment in which a double talk occurs.

In view of the foregoing, it is an object of the present invention to provide an echo canceller device and voice telecommunications device that can maintain echo-suppression performance which is stable under an environment where a double talk occurs.

Solution to Problem

According to a first aspect of the present invention, there is provided an echo canceller device which includes: an adaptive filtering unit configured to perform a filtering operation using a filter-coefficient group on a sequence of reception signals input thereto, and to adaptively update the filter-coefficient group on the basis of a voice-transmission signal input thereto from a sound collector; a false echo calculator configured to acquire current and previous filter-coefficient groups which have been used by the adaptive filtering unit, and to calculate false echo signals by performing filtering operations using the current and previous filter-coefficient groups, respectively, on the sequence of reception signals; an evaluation value calculator configured to calculate evaluated values of an echo cancellation quantity corresponding to the respective false echo signals on the basis of the voice-transmission signal and the false echo signals; a false echo selector configured to select, as an estimated echo component, a false echo signal from among the false echo signals on the basis of the evaluated values of the echo cancellation quantity; and a signal output unit configured to output a residual signal indicating a difference between the estimated echo component and the voice-transmission signal.

According to a second aspect of the present invention, there is provided an echo canceller device which includes: an adaptive filtering unit configured to perform a filtering operation using a filter-coefficient group on a sequence of reception signals input thereto, and to adaptively update the filter-coefficient group on the basis of a voice-transmission signal input thereto from a sound collector; a false echo calculator configured to acquire current and previous filter-coefficient groups which have been used by the adaptive filtering unit, and to calculate false echo signals by performing filtering operations using the filter-coefficient groups, respectively, on the sequence of reception signals; an evaluation value calculator configured to calculate evaluated values of an echo cancellation quantity corresponding to the respective false echo signals on the basis of the voice-transmission signal and the false echo signals; a filter selector configured to select a new filter-coefficient group from among the current and previous filter-coefficient groups on the basis of the evaluated values of the echo cancellation quantity; a foreground filter configured to generate an estimated echo component by performing a filtering operation using the new filter-coefficient group on the sequence of reception signals; and a subtractor configured to subtract the estimated echo component from the voice-transmission signal to thereby generate a residual signal.

According to a third aspect of the present invention, there is provided a voice telecommunications device which includes: a communication function unit configured to communicate with another voice telecommunications device via an electrical communication network; and the echo canceller device according to the above first or second aspect.

Advantageous Effects of Invention

According to the present invention, even if erroneous learning occurs in the adaptive filtering unit, the erroneous learning can be corrected and good echo-cancellation performance can be maintained.

DESCRIPTION OF EMBODIMENTS

Hereafter, various embodiments according to the present invention will be explained in detail with reference to drawings. It is assumed that components denoted by the same reference numerals in the whole of the drawings have the same configurations and the same functions.

Embodiment 1

Figure 1:
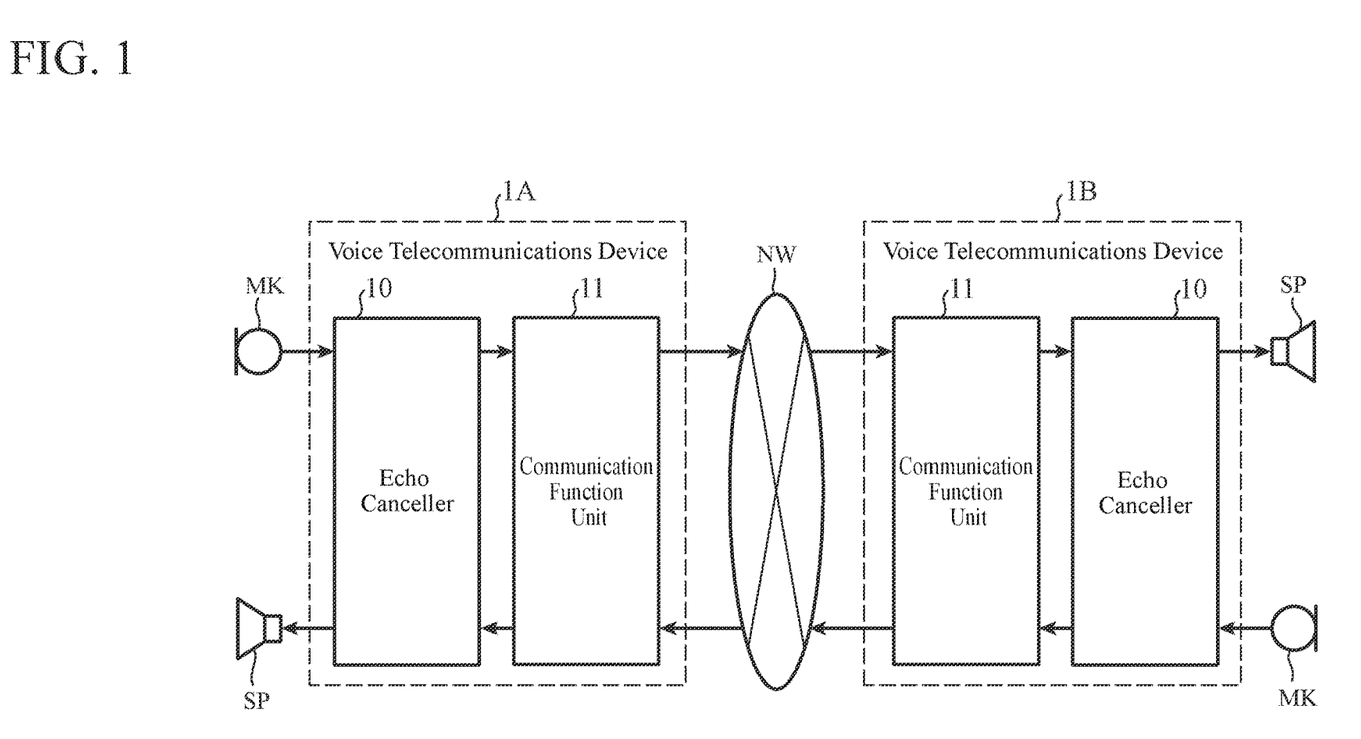
FIG. 1 is a diagram showing the schematic configuration of a communication system according to Embodiment 1 of the present invention.

FIG. 1 is a diagram showing the schematic configuration of a communication system including two voice telecommunications devices 1A and 1B each having an echo canceller 10 of Embodiment 1 according to the present invention. As shown in FIG. 1, the two voice telecommunications devices 1A and 1B are connected to each other via a communication line network NW, and have the same configuration. Each of the voice telecommunications devices 1A and 1B is connected to both a sound collector MK including a microphone, and a speaker SP that outputs a played-back sound which is an acoustic wave, and includes a communication function unit 11 that communicates with a voice telecommunications device on the other end of the communication, and an echo canceller 10 that reduces an acoustic echo component in a voice-transmission signal to be transmitted to the voice telecommunications device on the other end of the communication. When the sound collector MK is acoustically coupled to the speaker SP, more specifically, when an acoustic wave outputted by the speaker SP propagates through a medium such as air, a fluid, or a solid, and goes around to the sound collector MK and is detected, the sound collector MK can detect the acoustic wave as an acoustic echo. As the communication line network NW, for example, a wide area network such as a telephone network, a mobile communication network, or the Internet, or a small-scale communication network such as a LAN (Local Area Network) is provided.

Figure 2:
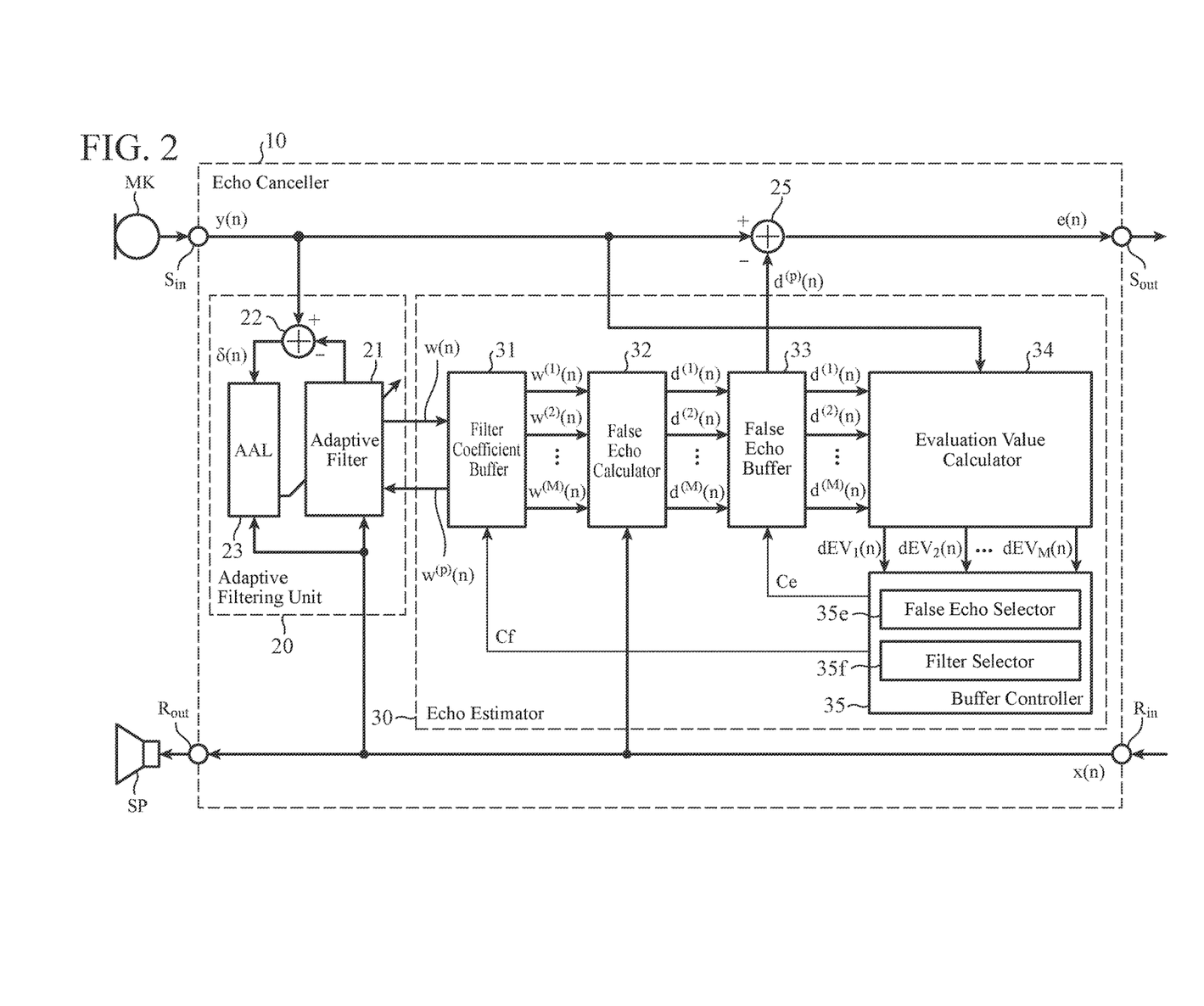
FIG. 2 is a block diagram showing the schematic configuration of an echo canceller of Embodiment 1.

FIG. 2 is a block diagram showing the schematic configuration of the echo canceller 10 of Embodiment 1. As shown in FIG. 2, the echo canceller 10 includes a signal input unit $S_{in}$ that samples a acoustic-sensor signal inputted thereto from the sound collector MK, to output a voice-transmission signal y(n), a line side signal output unit $S_{out}$ that outputs a residual signal e(n) which is the voice-transmission signal in which an acoustic echo component is reduced to the communication function unit 11, a line side signal input unit $R_{in}$ to which a reception signal x(n) received by the communication function unit 11 is inputted, and a signal output unit $R_{out}$ that outputs the reception signal x(n) to the speaker SP. All of the voice-transmission signal y(n), the reception signal x(n), and the residual signal e(n) are discrete time signals, and n is an integer specifying a discrete sampling time $T_n$.

The echo canceller 10 also includes an adaptive filtering unit 20 that performs a filtering operation using a filter-coefficient group w(n) in a time domain on a sequence of inputted reception signals x(n) (also referred to as a "reception signal sequence" hereafter). This adaptive filtering unit 20 also has a function of adaptively updating the filter-coefficient group w(n) dependently on the voice-transmission signal y(n), in accordance with a well-known adaptation algorithm such as an LMS (Least Mean Square) method or an NLMS (Normalized Least Mean Square) method.

The adaptive filtering unit 20 is configured so as to include an adaptive filter 21 that performs a convolution operation on the reception signal sequence and the filter-coefficient group w(n), a subtractor 22 that subtracts a filter output d(n) of this adaptive filter 21 from the voice-transmission signal y(n) to generate an error signal δ(n), and an adaptation algorithm unit (AAL) 23 that adaptively updates the filter-coefficient group w(n) dependently on this error signal δ(n), as shown in FIG. 2.

The reception signal sequence X(n) can be expressed by an N-dimensional vector given by the following equation (1).

$$X(n)=[x(n),x(n-1), \ldots, x(n-N+1)]^T \quad (1)$$

In this equation, N is an integer equal to or larger than 3, and a symbol T shows a transposition that transforms a row vector with one row and N columns into a column vector with N rows and one column. The filter-coefficient group w(n) used in the convolution operation can be expressed by an N-dimensional vector given by the following equation (2).

$$w(n)=[w_0(n),w_1(n), \ldots, w_{N-1}(n)]^T \quad (2)$$

The adaptive filter 21 can calculate the filter output d(n) by performing a convolution operation on the reception signal sequence X(n) and the filter-coefficient group w(n) in accordance with the following equation (3).

$$d(n)=\{w(n)\}^T X(n) \quad (3)$$

Further, the subtractor 22 calculates the error signal δ(n) by subtracting the filter output d(n) from the voice-transmission signal y(n), as shown in the following equation.

$$\delta(n)=y(n)-\{w(n)\}^T X(n) \quad (4)$$

The adaptation algorithm unit 23 successively corrects the filter-coefficient group w(n) in such a way that the size of the error signal δ(n) is minimized under a predetermined condition. In a case in which a well-known NLMS method which is also called a learning identification method is adopted, the adaptation algorithm unit 23 can derive a new filter-coefficient group w(n+1) in accordance with the following equation (5).

$$w(n+1)=w(n)+\mu(n-1)\cdot e(n-1)\cdot X(n-1) \quad (5)$$

In this equation, μ(n−1) is a coefficient at a sampling time $T_{n-1}$, and, for example, is given by the following equation (6).

$$\mu(n-1) = \frac{\alpha}{N\sigma_x + \beta} \cong \frac{\alpha}{\{X(n-1)\}^T X(n-1) + \beta} \quad (6)$$

In this equation, α is a step size for adjusting the amount of update of the filter-coefficient group, and β is a very small number preventing the denominator of the middle expression of the equation (6) from becoming zero. Further, N is equal to the filter length of the adaptive filter 21, and $\sigma_x$ is a variance of the reception signal. In addition, $N\sigma_x$ can be approximated by the square of the norm of a reception signal sequence X(n−1): $|\,|X(n-1)|\,|^2 (=\{X(n-1)\}^T \cdot X(n-1))$ The adaptation algorithm unit 23 then updates the filter-coefficient group w(n) by replacing the current-time filter-coefficient group w(n) in the adaptive filter 21 with the new filter-coefficient group w(n+1). Because the filter-coefficient group w(n) indicates an estimated amount of the characteristics of an echo path extending from the speaker SP to the sound collector MK, the successive updating of the filter-coefficient group w(n) means that successive estimation of the echo path characteristics, i.e., learning of the echo path characteristics is carried out. The adaptation algorithm is not limited to an LMS method and an NLMS method. For example, the configuration of the adaptive filtering unit 20 can be modified suitably in such a way that the adaptive filtering unit operates in accordance with another adaptation algorithm such as an affine projection method or an RLS (Recursive Least Square) method. Further, although the adaptive filtering unit 20 according to the present embodiment has a function of successively updating the filter-coefficient group w(n) in a time domain while performing an adaptive filtering operation in a time domain, the present invention is not limited to this example. Instead of the adaptive filtering unit 20, an adaptive filter configuration for successively updating a filter-coefficient group in a frequency domain while performing an adaptive filtering operation in a frequency domain can be used.

Next referring to FIG. 2, the echo canceller 10 includes an echo estimator 30 that stabilizes the learning carried out by the above-mentioned adaptive filtering unit 20, and that calculates an estimated echo component $d^{(p)}(n)$. This echo estimator 30 is configured so as to include a filter coefficient buffer 31, a false echo calculator 32, a false echo buffer 33, an evaluation value calculator 34, and a buffer controller 35.

Every time the filter-coefficient group in the adaptive filter 21 is updated, the filter coefficient buffer 31 temporarily stores the updated filter-coefficient group supplied thereto from the adaptive filter 21. Further, the filter coefficient buffer 31 temporarily stores a fixed number of the current-time and previous-time filter-coefficient groups $w^{(1)}(n)$, $w^{(2)}(n), \ldots$, and $w^{(M)}(n)$ (M is an integer equal to or larger than 3) which have been used by the adaptive filtering unit 20. It is assumed in this specification that "current-time" means the latest sampling time, and "previous-time" means a sampling time prior to the latest sampling time.

A relationship between the current and previous filter-coefficient groups $w^{(1)}(n)$, $w^{(2)}(n), \ldots$, and $w^{(M)}(n)$ stored in the filter coefficient buffer 31, and the filter-coefficient groups used by the adaptive filtering unit 20 is, for example, as shown in the following equation (7).

$$[w^{(1)}(n),w^{(2)}(n), \ldots ,w^{(M)}(n)]=[w(n),w(n-1), \ldots ,w(n-M+1)] \quad (7)$$

More specifically, the k-th filter-coefficient group $w^{(k)}(n)$ stored in the filter coefficient buffer 31 is the filter-coefficient group w(n−k+1) at the sampling time $T_{n-k+1}$. When receiving the newest filter coefficient w(n+1) supplied thereto from the adaptive filtering unit 20, the filter coefficient buffer 31 deletes the oldest filter-coefficient group from the stored filter-coefficient groups, to update the filter-coefficient groups, as shown in the following equation (8).

$$[w^{(1)}(n+1),w^{(2)}(n+1), \ldots ,w^{(M)}(n+1)]=[w(n+1), \ldots ,w(n-M+2)] \quad (8)$$

Although it is preferable that the sampling times $T_n$ and $T_{n-1}$ of the current and previous filter-coefficient groups w(n) and w(n−1) stored in the filter coefficient buffer 31 be successive as shown in the above equation (7), the present invention is not limited to this example. The current and previous filter-coefficient groups at non-successive sampling times can be alternatively stored in the filter coefficient buffer 31, and can be used.

Next, the false echo calculator 32 calculates M false echo signals $d^{(1)}(n)$ to $d^{(M)}(n)$ by performing a filtering operation using each of the filter-coefficient groups $w^{(1)}(n)$ to $w^{(M)}(n)$ read from the filter coefficient buffer 31 on the reception signal sequence X(n) M times. The k-th false echo signal $d^{(k)}(n)$ is calculated by performing a convolution operation using the k-th filter-coefficient group $w^{(k)}(n)$ in accordance with the following equation (9).

$$d^{(k)}(n) = \{w^{(k)}(n)\}^T X(n) \qquad (9)$$

The false echo buffer 33 temporarily stores the false echo signals $d^{(1)}(n)$ to $d^{(M)}(n)$ which are supplied thereto from the false echo calculator 32. As shown in FIG. 2, the evaluation value calculator 34 calculates M evaluated values $dEV_1(n)$ to $dEV_M(n)$ of an echo cancellation quantity on the basis of both the false echo signals $d^{(1)}(n)$ to $d^{(m)}(n)$ read from the false echo buffer 33, and the current voice-transmission signal y(n). Concretely, as shown below as equation (10), the k-th evaluated value $dEV_k(n)$ of the echo cancellation quantity is calculated as the square of the ratio of the voice-transmission signal y(n) to the difference between the voice-transmission signal y(n) and the k-th false echo signal $d^{(k)}(n)$.

$$EV_k(n) = \{y(n)\}^2 / \{y(n) - d^{(k)}(n)\}^2 \qquad (10)$$

The evaluation value calculator 34 further calculates an evaluated value $dEV_k(n)$ of the echo cancellation quantity expressed in decibels, as shown below as equation (11), and supplies the evaluated value $dEV_k(n)$ of the echo cancellation quantity to the buffer controller 35.

$$\begin{aligned} dEV_k(n) &= 10 \times \log_{10} EV_k(n) \\ &= 10 \times \log_{10} \{y(n)\}^2 - 10 \times \log_{10} \{y(n) - d^{(k)}(n)\}^2 \end{aligned} \qquad (11)$$

The buffer controller 35 has a filter selector 35f and a false echo selector 35e. The false echo selector 35e selects, as the estimated echo component $d^{(p)}(n)$, one optimal false echo signal from the M false echo signals $d^{(1)}(n)$ to $d^{(M)}(n)$ on the basis of the M evaluated values $dEV_1(n)$ to $dEV_M(n)$ of the echo cancellation quantity supplied thereto from the evaluation value calculator 34, and supplies a control signal Ce showing the selection result to the false echo buffer 33. The false echo buffer 33 supplies the estimated echo component $d^{(p)}(n)$ to the subtractor 25 in accordance with this control signal Ce. The subtractor 25 receives both the voice-transmission signal y(n) and the estimated echo component $d^{(p)}(n)$, and subtracts the estimated echo component $d^{(p)}(n)$ from the voice-transmission signal y(n) to generate a residual signal e(n), as shown in the following equation (12).

$$e(n) = y(n) - d^{(p)}(n) \qquad (12)$$

This residual signal e(n) is outputted to the communication function unit 11 by the line side signal output unit $S_{out}$.

Figure 3:
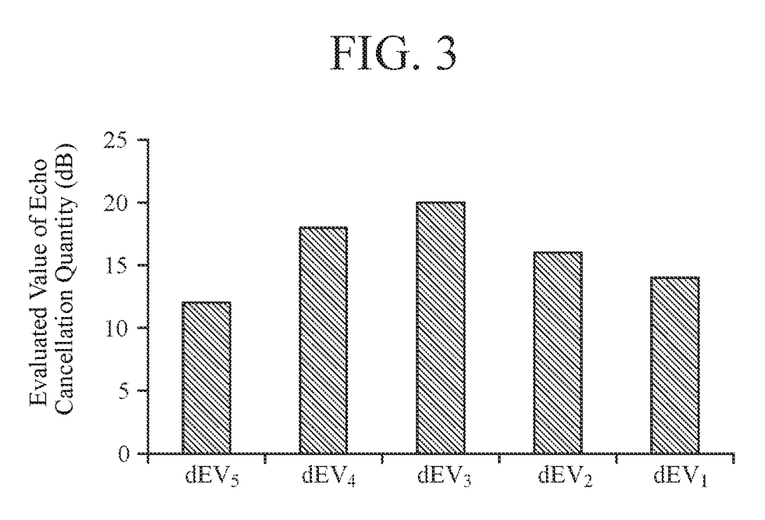
FIG. 3 is a graph showing an example of evaluated values of an echo cancellation quantity according to Embodiment 1.

FIG. 3 is a graph showing an example of evaluated values $dEV_1$ to $dEV_5$ of an echo cancellation quantity expressed in decibels. For example, the false echo selector 35e can select, as the estimated echo component $d^{(p)}(n)$, a false echo signal corresponding to the largest evaluated value $dEV_3$ of the echo cancellation quantity among the evaluated values $dEV_1$ to $dEV_5$ of the echo cancellation quantity.

On the other hand, the filter selector 35f selects a filter-coefficient group $w^{(p)}(n)$ from the filter-coefficient groups $w^{(1)}(n)$ to $w^{(M)}(n)$ stored in the filter coefficient buffer 31 on the basis of the M values $dEV_1(n)$ to $dEV_M(n)$ of the echo cancellation quantity. For example, the filter selector 35f can select, as a new filter-coefficient group, a filter-coefficient group $w^{(p)}(n)$ corresponding to the largest evaluated value $dEV_p(n)$ of the echo cancellation quantity among the evaluated values $dEV_1(n)$ to $dEV_M(n)$ of the echo cancellation quantity, from the filter-coefficient groups $w^{(1)}(n)$ to $w^{(M)}(n)$.

The filter selector 35f then supplies a control signal Cf showing the selection result to the filter coefficient buffer 31. The filter coefficient buffer 31 supplies the new filter-coefficient group $w^{(p)}(n)$ to the adaptive filter 21 in accordance with this control signal Cf. Accordingly, the adaptive filter 21 updates the filter-coefficient group w(n) currently set thereto by replacing the filter-coefficient group w(n) with the new filter-coefficient group $w^{(p)}(n)$. Therefore, even when the degree of accuracy of the estimation of the echo path characteristics decreases in the adaptive filtering unit 20, and erroneous learning of the echo path characteristics occurs, the filter-coefficient group w(n) can be replaced by a previous filter-coefficient group which has been used when the learning could be carried out normally. As a result, an advantage of providing an improvement in the stabilization of the learning of the echo path characteristics which is carried out by the adaptive filtering unit 20 is provided. Further, the robustness against a disturbance signal, such as a near end speaker's voice or background noise, which is mixed into the acoustic echo is also improved.

When the evaluation value calculator 34 calculates the evaluated value $dEV_p(n)$ of the echo cancellation quantity, the same signal component ($= y(n) - d^{(p)}(n)$) as the residual signal e(n) which is the output of the subtractor 25 has been calculated. Therefore, instead of the subtractor 25, a buffer memory that temporarily stores the signal components (y(n)−$d^{(k)}(n)$) (k=1 to M) which are calculated by the evaluation value calculator 34 can be used. This buffer memory has only to supply, as the residual signal e(n), the signal component (y(n)−$d^{(p)}(n)$) corresponding to the largest evaluated value $dEV_p(n)$ of the echo cancellation quantity to the line side signal output unit $S_{out}$.

Figure 4:
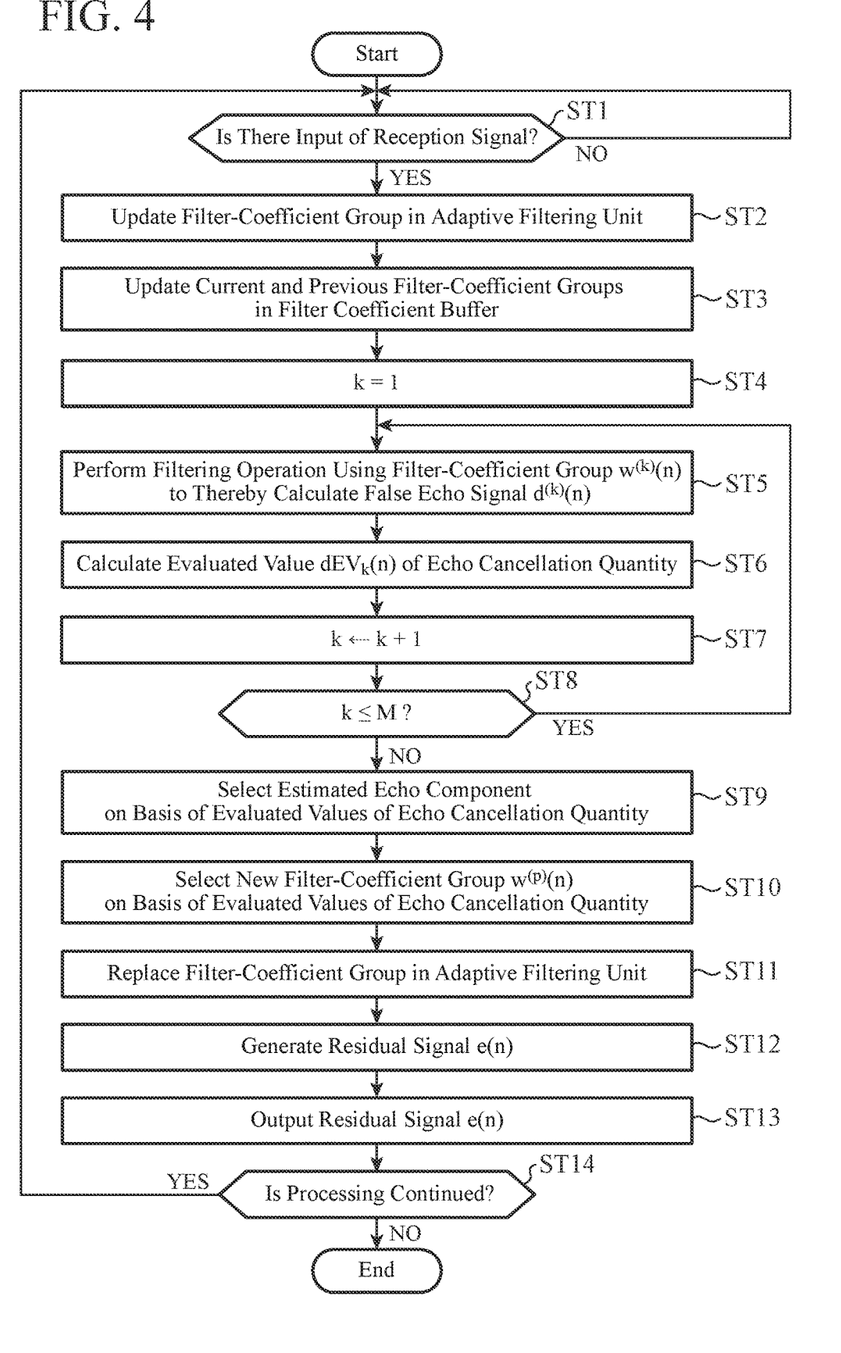
FIG. 4 is a flow chart showing an example of the procedure of echo cancellation processing according to Embodiment 1.

Next, an example of the operation of the above-mentioned echo canceller 10 will be explained while referring to FIG. 4. FIG. 4 is a flow chart schematically showing an example of the procedure of the echo cancellation processing carried out by the echo canceller 10.

Referring to FIG. 4, the adaptive filtering unit 20 stands by until a reception signal sequence X(n) is inputted at a sampling time $T_n$ (when NO in step ST1). When a reception signal sequence X(n) is inputted (when YES in step ST1), the adaptive filtering unit 20 performs a filtering operation as mentioned above to update the filter-coefficient group (step ST2). The updated filter-coefficient group w(n) is supplied to the filter coefficient buffer 31. When receiving the updated filter-coefficient group w(n) supplied thereto from the adaptive filter 21, the filter coefficient buffer 31 updates the filter-coefficient groups stored therein (step ST3).

Next, the false echo calculator 32 sets the filter-coefficient group number k to "1" (step ST4), and performs a filtering operation using the k-th filter-coefficient group $w^{(k)}(n)$ read from the filter coefficient buffer 31, to generate a false echo signal $d^{(k)}(n)$ (step ST5). This false echo signal $d^{(k)}(n)$ is stored in the false echo buffer 33. Next, the evaluation value calculator 34 calculates an evaluated value $dEV_k(n)$ of the echo cancellation quantity on the basis of both the false echo signal $d^{(k)}(n)$ and the current voice-transmission signal $y(n)$ (step ST6). This evaluated value $dEV_k(n)$ of the echo cancellation quantity is supplied to the buffer controller 35. After that, the evaluation value calculator 34 increments the number k by 1 (step ST7), and, when the number k is equal to or smaller than a maximum M (when YES in step ST8), returns the processing procedure to the step ST5.

In contrast, when the number k is not equal to or smaller than the maximum M (when NO in step ST8), in other words, when the M evaluated values $dEV_1(n)$ to $dEV_M(n)$ of the echo cancellation quantity are calculated for all the false echo signals $d^{(1)}(n)$ to $d^{(M)}(n)$, the processing procedure shifts to step ST9. In the example shown in FIG. 4, the M evaluated values $dEV_1(n)$ to $dEV_M(n)$ of the echo cancellation quantity are calculated in this order (steps ST4 to ST8). Alternatively, the M evaluated values $dEV_1(n)$ to $dEV_M(n)$ of the echo cancellation quantity can be concurrently calculated in parallel.

The false echo selector 35e, in the next step ST9, selects, as the estimated echo component $d^{(p)}(n)$, one optimal false echo signal from the M false echo signals $d^{(1)}(n)$ to $d^{(M)}(n)$ on the basis of the evaluated values $dEV_1(n)$ to $dEV_M(n)$ of the echo cancellation quantity (step ST9). A control signal Ce showing this selection result is supplied to the false echo buffer 33.

On the other hand, the filter selector 35f selects a new filter-coefficient group $w^{(p)}(n)$ from the filter-coefficient groups $w^{(1)}(n)$ to $w^{(M)}(n)$ stored in the filter coefficient buffer 31 on the basis of the evaluated values $dEV_1(n)$ to $dEV_M(n)$ of the echo cancellation quantity (step ST10). A control signal Cf showing this selection result is supplied to the filter coefficient buffer 31.

After that, the filter coefficient buffer 31 replaces the filter-coefficient group $w(n)$ in the adaptive filtering unit 20 with the new filter-coefficient group $w^{(p)}(n)$ by supplying the new filter-coefficient group $w^{(p)}(n)$ specified by the control signal Cf to the adaptive filter 21 (step ST11).

On the other hand, the false echo buffer 33 causes the subtractor 25 to generate a residual signal $e(n)$ by supplying the estimated echo component $d^{(p)}(n)$ specified by the control signal Ce to the subtractor 25 (step ST12). After that, the line side signal output unit $S_{out}$ outputs the residual signal $e(n)$ to the communication function unit 11 (step ST13).

When the echo cancellation processing is continued after the step ST13 (when YES instep ST14), the processing procedure returns to the step ST1. In contrast, when the echo cancellation processing is not continued (when NO in step ST14), the echo cancellation processing is ended.

The above-mentioned steps ST9, ST10, ST11, and ST12 do not have to be processed in this order. For example, the steps ST9 and ST10 can be performed simultaneously in parallel, and the steps ST11 and ST12 can be performed simultaneously in parallel. Further, the step ST11 can be performed before the step ST10 is performed.

The hardware configuration of the above-mentioned echo canceller 10 can be implemented by, for example, a computer, such as a workstation or a mainframe, in which a CPU (Central Processing Unit) is included. As an alternative, the hardware configuration of the above-mentioned echo canceller 10 can be implemented by an LSI (Large Scale Integrated circuit) such as a DSP (Digital Signal Processor), an ASIC (Application Specific Integrated Circuit), or an FPGA (Field-Programmable Gate Array).

Figure 5:
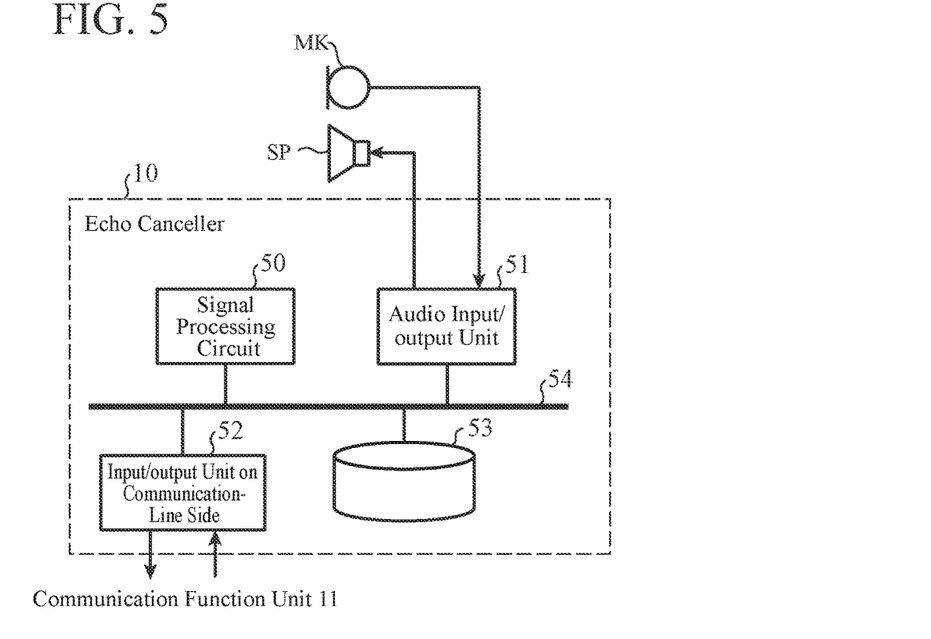
FIG. 5 is a diagram showing an example of the hardware configuration of the echo canceller of Embodiment 1.

FIG. 5 is a block diagram showing an example of the hardware configuration of the echo canceller 10 which is configured using an LSI such as a DSP, an ASIC, or an FPGA. In the example shown in FIG. 5, the echo canceller 10 is comprised of a signal processing circuit 50, an audio input/output unit 51, an input/output unit 52 on the communication-line side, a recording medium 53, and a signal path 54 such as a bus. The audio input/output unit 51 is an interface circuit that implements the functions of the signal input unit $S_{in}$ and the signal output unit $R_{out}$, and the input/output unit 52 on the communication-line side is an interface circuit that implements the functions of the line side signal output unit $S_{out}$ and the line side signal input unit $R_{in}$. The functions of the adaptive filtering unit 20, the echo estimator 30, and the subtractor 25 can be implemented by the signal processing circuit 50 and the recording medium 53. The recording medium 53 can be used as the filter coefficient buffer 31 and the false echo buffer 33. As the recording medium 53, for example, a volatile memory such as an SDRAM (Synchronous DRAM), an HDD (hard disk drive), or an SSD (solid-state drive) can be used.

Figure 6:
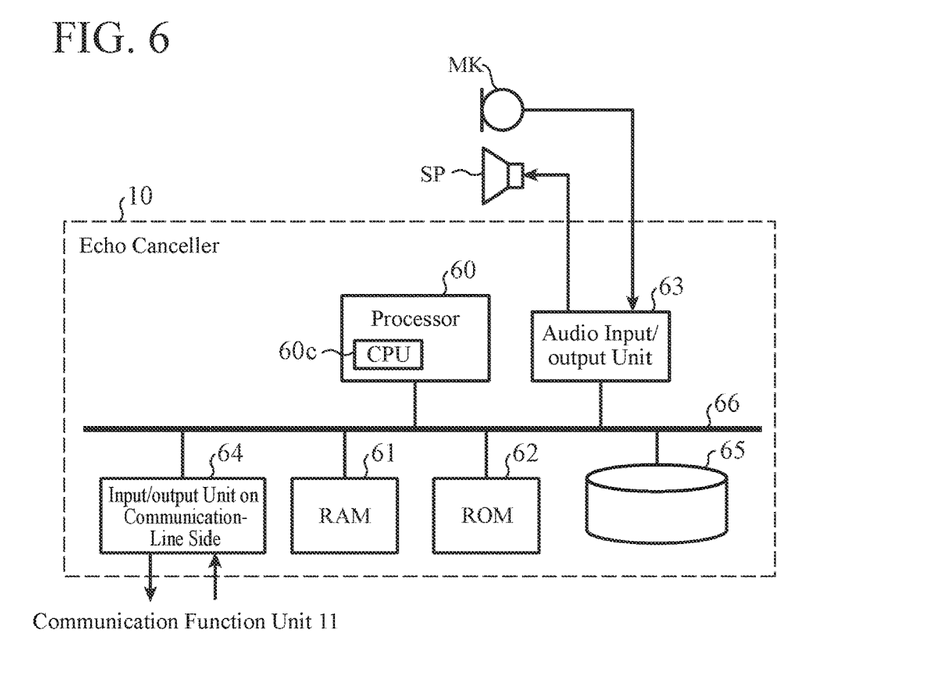
FIG. 6 is a diagram showing another example of the hardware configuration of the echo canceller of Embodiment 1.

On the other hand, FIG. 6 is a block diagram showing an example of the hardware configuration of the echo canceller 10 which is configured using a computer. In the example shown in FIG. 6, the echo canceller 10 is comprised of a processor 60 in which a CPU 60c is included, a RAM (Random Access Memory) 61, a ROM (Read Only Memory) 62, an audio input/output unit 63, an input/output unit 64 on the communication-line side, a recording medium 65, and a signal path 66 such as a bus. The audio input/output unit 63 is an interface circuit that implements the functions of the signal input unit $S_{in}$ and the signal output unit $R_{out}$, and the input/output unit 64 on the communication-line side is an interface circuit that implements the functions of the line side signal output unit $S_{out}$ and the line side signal input unit $R_{in}$. The functions of the adaptive filtering unit 20, the echo estimator 30, and the subtractor 25 can be implemented by the processor 60 and the recording medium 65. The recording medium 65 can be used as the filter coefficient buffer 31 and the false echo buffer 33. The processor 60 can carry out the same signal processing as that carried out by the adaptive filtering unit 20, the echo estimator 30, and the subtractor 25 by using the RAM 61 as a memory for operations, and operating in accordance with a computer program read from the ROM 62. As the recording medium 65, for example, a volatile memory such as an SDRAM, an HDD, or an SSD can be used.

As explained above, the echo canceller 10 of Embodiment 1 can generate a residual signal $e(n)$ by selectively using an estimated echo component $d^{(p)}(n)$ from the false echo signals stored in the false echo buffer 33 even when the accuracy of estimation of the echo path characteristics degrades in the adaptive filtering unit 20 and erroneous learning of the echo path characteristics occurs. Therefore, echo cancellation performance which is stable under an environment in which a double talk occurs can be achieved. Further, the filter-coefficient group $w(n)$ in the adaptive filtering unit 20 can also be replaced by a previous filter-coefficient group which has been used when the learning could be carried out normally. As a result, the learning of the echo path characteristics which is carried out by the adaptive filtering unit 20 can be more stabilized compared with conventional techniques. Further, the robustness against a disturbance signal, such as a near end speaker's voice or background noise, which is mixed into the acoustic echo is improved. Particularly, by setting the above-mentioned number M to be a large value to a certain extent, the robustness against a relatively prolonged double talk state can be improved.

In addition, because the amount of the echo cancellation can be maximized by selectively using the estimated echo component $d^{(p)}(n)$ from the false echo signals stored in the false echo buffer 33 when an echo-path variation occurs due to an environmental variation such as a motion of a person existing in the vicinity of the speaker SP, the high-speed followability to echo-path variations is improved. Therefore, the echo canceller 10 according to the present embodiment can maintain echo cancellation performance which is stable even under an environment in which a double talk or an echo-path variation occurs.

Embodiment 2

Figure 7:
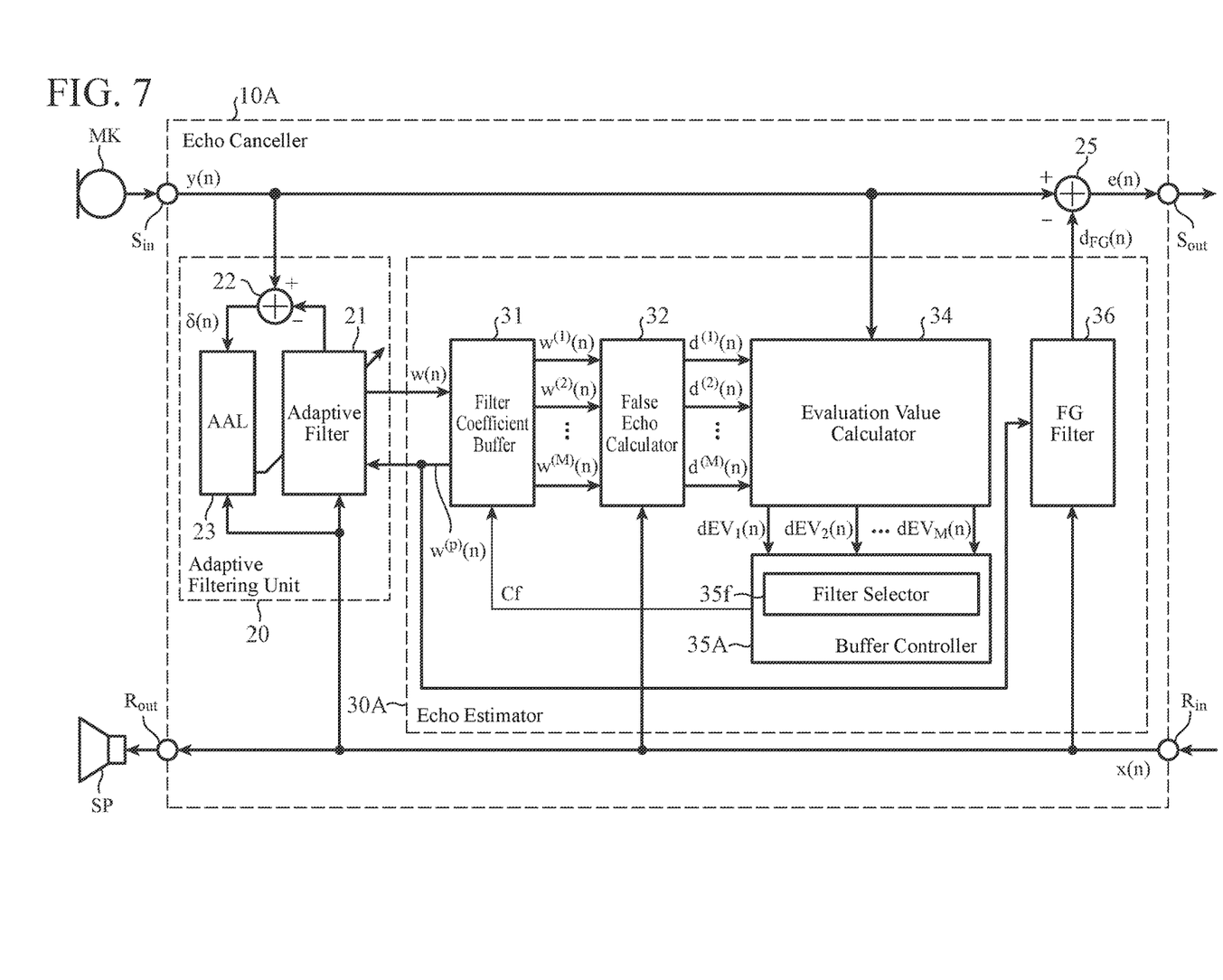
FIG. 7 is a block diagram showing the schematic configuration of an echo canceller of Embodiment 2 of the present invention.

Next, Embodiment 2 according to the present invention will be explained. FIG. 7 is a block diagram showing the schematic configuration of an echo canceller 10A of Embodiment 2. A voice telecommunications device can be configured by a combination of this echo canceller 10A and a communication function unit 11 shown in FIG. 1, like in the case of the echo canceller 10 of Embodiment 1 described above.

As shown in FIG. 7, the echo canceller 10A of Embodiment 2 includes a signal input unit $S_{in}$, a signal output unit $R_{out}$, a line side signal output unit $S_{out}$, and a line side signal input unit $R_{in}$, and also includes an adaptive filtering unit 20 and a subtractor 25, like the echo canceller 10 according to Embodiment 1 described above.

Further, the echo canceller 10A includes an echo estimator 30A. This echo estimator 30A has a filter coefficient buffer 31, a false echo calculator 32, and an evaluation value calculator 34, like the echo estimator 30 according to Embodiment 1 described above, and further has a buffer controller 35A including a filter selector 35f, and an FG (foreground) filter 36.

The FG filter 36 generates an estimated echo component $d_{FG}(n)$ by performing a filtering operation using a filter-coefficient group $w_{FG}(n)$ on a reception signal sequence $X(n)$.

Concretely, the FG filter 36 can generate an estimated echo component $d_{FG}(n)$ by performing a convolution operation on the reception signal sequence $X(n)$ and the filter-coefficient group $w_{FG}(n)$ in accordance with the following equation (13).

$$d_{FG}(n)=\{w_{FG}(n)\}^T X(n) \quad (13)$$

The subtractor 25 subtracts the estimated echo component $d_{FG}(n)$ from a voice-transmission signal $y(n)$ to generate a residual signal $e(n)$. This residual signal $e(n)$ is outputted to the communication function unit 11 by the line side signal output unit $S_{out}$.

Figure 8:
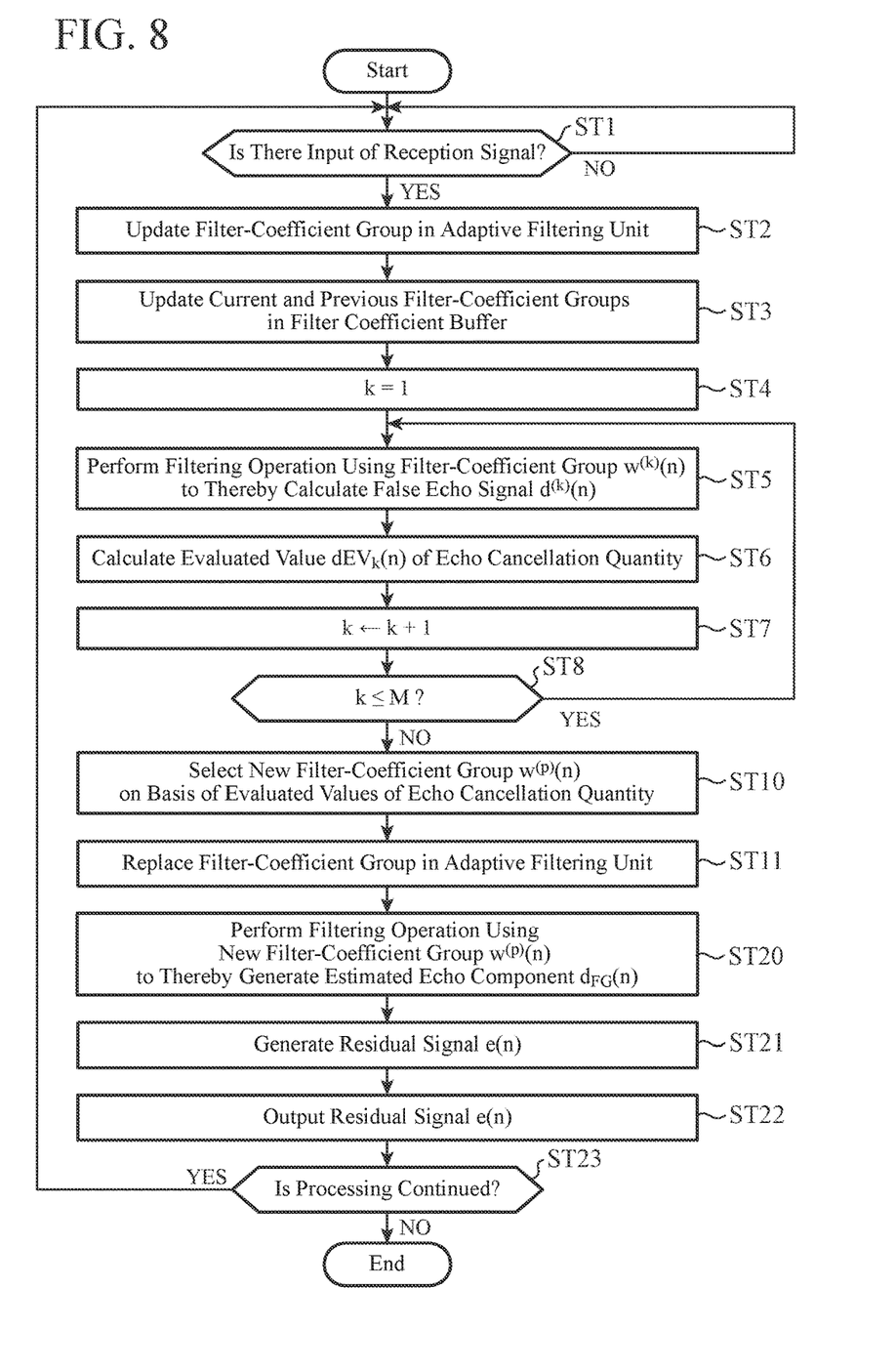
FIG. 8 is a flow chart showing an example of the procedure of echo cancellation processing according to Embodiment 2.

Next, an example of the operation of the above-mentioned echo canceller 10A will be explained while referring to FIG. 8. FIG. 8 is a flow chart schematically showing an example of the procedure of the echo cancellation processing carried out by the echo canceller 10A. Because the details of operations of steps ST1 to ST11 of FIG. 8 are the same as those of the steps ST1 to ST11 of FIG. 3 according to Embodiment 1 described above, the explanation of the details of the operations will be omitted hereafter.

The FG filter 36, in step ST20, generates an estimated echo component $d_{FG}(n)$ by performing a filtering operation using a new filter-coefficient group $w^{(p)}(n)$ acquired from the filter coefficient buffer 31 (step ST20). Concretely, when receiving the new filter-coefficient group $w^{(p)}(n)$ supplied thereto, the FG filter 36 updates a previous filter-coefficient group $w_{FG}(n-1)$ thereof to a filter-coefficient group $w_{FG}(n)$ ($=w^{(p)}(n)$) by replacing the filter-coefficient group $w_{FG}(n-1)$ with the new filter-coefficient group $w^{(p)}(n)$. The FG filter 36 can then generate an estimated echo component $d_{FG}(n)$ by performing a convolution operation on the updated filter-coefficient group $w_{FG}(n)$ and the reception signal sequence $X(n)$.

As an alternative, the FG filter 36 can generate a combination filter-coefficient group by performing a linear combination of the new filter-coefficient group $w^{(p)}(n)$ and the previous filter-coefficient group $w_{FG}(n-1)$ which has been used by the FG filter 36, and replace the previous filter-coefficient group $w_{FG}^{(p)}(n-1)$ with the combination filter-coefficient group $w^{(p)}(n)$. The FG filter 36 can then generate an estimated echo component $d_{FG}(n)$ by performing a filtering operation using this combination filter-coefficient group $w_{FG}(n)$. When a weighting factor assigned to the new filter-coefficient group $w^{(p)}(n)$ is denoted by $\gamma$, the combination filter-coefficient group $w_{FG}(n)$ can be calculated in accordance with the following equation (14).

$$w_{FG}(n)=(1-\gamma)\cdot w_{FG}(n-1)+\gamma\cdot w^{(p)}(n) \quad (14)$$

The weighting factor $\gamma$ is called an oblivion coefficient. It is preferable to set the oblivion coefficient $\gamma$ to a value close to zero. For example, it is desirable that the oblivion coefficient is larger than zero and falls within a range smaller than 0.1. Because the filter-coefficient group of the adaptive filtering unit 20 is incorporated in the FG filter 36 over a certain period of time by using such the combination filter-coefficient group as above, an improvement in the robustness against a double talk can be provided.

After the above-mentioned step ST20, the subtractor 25 subtracts the estimated echo component $d_{FG}(n)$ from the voice-transmission signal $y(n)$ to generate a residual signal $e(n)$ (step ST21), and the line side signal output unit $S_{out}$ outputs the residual signal $e(n)$ to the communication function unit 11 (step ST22).

After that, when the echo cancellation processing is continued (when YES in step ST23), the processing procedure returns to the step ST1. In contrast, when the echo cancellation processing is not continued (when NO in step ST23), the echo cancellation processing is ended.

The hardware configuration of the echo canceller 10A according to the present embodiment can be implemented by, for example, a computer, such as a workstation or a mainframe, in which a CPU is included. As an alternative, the hardware configuration of the echo canceller 10A can be implemented by an LSI such as a DSP, an ASIC, or an FPGA. The hardware configuration of the echo canceller 10A can be alternatively implemented by the configuration shown in FIG. 5 or 6, like in the case of Embodiment 1.

As explained above, in the echo canceller 10A of Embodiment 2, an optimal filter-coefficient group $w^{(p)}(n)$ is selected from the current and previous filter-coefficient groups $w^{(1)}(n)$ to $w^{(M)}(n)$ which have been used by the adaptive filtering unit 20, and this filter-coefficient group $w^{(p)}(n)$ is incorporated in the filter-coefficient group $w_{FG}(n)$ of the FG filter 36. The FG filter 36 generates an estimated echo component $d_{FG}(n)$ by using this filter-coefficient group $w_{FG}(n)$. Further, the filter-coefficient group $w(n)$ in the adaptive filtering unit 20 can also be replaced by a previous filter-coefficient group which has been used when the learning could be carried out normally. Therefore, the robustness against a disturbance signal can be more improved compared with conventional techniques. Therefore, stable echo cancellation performance can be achieved.

Although the various embodiments of the present invention are described with reference to the drawings, as previously explained, these embodiments exemplify the present invention, and various embodiments other than these embodiments can also be adopted. For example, for the sake of expediency in explanation, the filter coefficient buffer 31 according to any of Embodiments 1 and 2 is configured so as to store three or more filter-coefficient groups $w^{(1)}(n)$ to $w^{(M)}(n)$. However, the present invention is not limited to this example, and the filter coefficient buffer can be configured so as to store two filter-coefficient groups $w^{(1)}(n)$ and $w^{(2)}(n)$. In this case, the evaluation value calculator 34 calculates two evaluated values $dEV_1(n)$ and $dEV_2(n)$ of the echo cancellation quantity.

Within the scope of the present invention, an arbitrary combination of Embodiments 1 and 2 as described above can be made, a change can be made in an arbitrary component according to any of the above-mentioned embodiments, or an arbitrary component according to any of the above-mentioned embodiments can be omitted.

INDUSTRIAL APPLICABILITY

The echo canceller device and the voice telecommunications device according to the present invention can be used for, for example, a fixed-line phone, a mobile phone with a loud speaking function, a handsfree communication system, and a video conferencing system.

REFERENCE SIGNS LIST 1A, 1B: voice telecommunications devices; 10, 10A: echo cancellers; 11: communication function unit; 20: adaptive filtering unit; 21: adaptive filter; 22: subtractor; 23: adaptation algorithm unit (AAL); 25: subtractor; 30, 30A: echo estimators; 31: filter coefficient buffer; 32: false echo calculator; 33: false echo buffer; 34: evaluation value calculator; 35, 35A: buffer controller; 35e: false echo selector; 35f: filter selector; 36: FG (foreground) filter; 50: signal processing circuit; 51: audio input/output unit; 52: input/output unit on the communication-line side; 53: recording medium; 54: signal path; 60: processor; 60c: CPU; 61: RAM; 62: ROM; 63: audio input/output unit; 64: line side input output unit; 65: recording medium; 66: signal path; MK: sound collector; SP: speaker; $S_{in}$: signal input unit; $S_{out}$: line side signal output unit; $R_{out}$: signal output unit; and $R_{in}$: line side signal input unit.

The invention claimed is:

1. An echo canceller device comprising:
an adaptive filtering unit to perform a filtering operation using a filter-coefficient group on a sequence of reception signals input thereto, and to adaptively update the filter-coefficient group on a basis of a voice-transmission signal input thereto from a sound collector;
a false echo calculator to acquire current and previous filter-coefficient groups which have been used by the adaptive filtering unit, and to calculate false echo signals by performing filtering operations using the current and previous filter-coefficient groups, respectively, on the sequence of reception signals;
an evaluation value calculator to calculate evaluated values of an echo cancellation quantity corresponding to the respective false echo signals on a basis of the voice-transmission signal and the false echo signals;
a false echo selector to select, as an estimated echo component, a false echo signal from among the false echo signals on a basis of the evaluated values of the echo cancellation quantity; and
a signal output unit to output a residual signal indicating a difference between the estimated echo component and the voice-transmission signal.

2. The echo canceller device according to claim 1, further comprising a filter selector to select, as a new filter-coefficient group, a filter-coefficient group from among the current and previous filter-coefficient groups on a basis of the plural evaluated values of the echo cancellation quantity, wherein
the filter selector replaces values of the filter-coefficient group in the adaptive filtering unit with the new filter-coefficient group.

3. The echo canceller device according to claim 2, further comprising a filter coefficient buffer to temporarily store the current and previous filter-coefficient groups, wherein
the filter coefficient buffer supplies the new filter-coefficient group to the adaptive filtering unit under control of the filter selector.

4. The echo canceller device according to claim 1, wherein the evaluation value calculator calculates, as each of the evaluated values of the echo cancellation quantity, a square of a ratio of the voice-transmission signal to a difference between the voice-transmission signal and each of the false echo signals.

5. The echo canceller device according to claim 1, wherein the evaluated values of the echo cancellation quantity are calculated on a basis of a current voice-transmission signal input from the sound collector.

6. The echo canceller device according to claim 1, further comprising:
a false echo buffer to temporarily store the false echo signals; and
a subtractor to receive the voice-transmission signal supplied thereto, wherein
the false echo buffer outputs the estimated echo component under control of the false echo selector, and the subtractor subtracts the estimated echo component outputted from the false echo buffer, from the voice-transmission signal to thereby generate the residual signal.

7. The echo canceller device according to claim 1, wherein the adaptive filtering unit carries out the updating by using an adaptation algorithm based on a learning identification method.

8. A voice telecommunications device comprising:
a communication function unit to communicate with another voice telecommunications device via an electrical communication network; and
the echo canceller device according to claim 1 connected to both a speaker for converting into an acoustic wave a reception signal sequence input thereto from the communication function unit to emit the acoustic wave, and a sound collector, wherein
the echo canceller device reduces an acoustic echo component in a voice-transmission signal input thereto from the sound collector, using the reception signal sequence.

* * * * *